(12) United States Patent
Xu et al.

(10) Patent No.: US 11,244,115 B2
(45) Date of Patent: Feb. 8, 2022

(54) HYPERGRAPH-BASED METHOD FOR SEGMENTING AND CLUSTERING CUSTOMER OBSERVABLES FOR VEHICLES

(71) Applicant: HRL Laboratories, LLC, Malibu, CA (US)

(72) Inventors: Jiejun Xu, Diamond Bar, CA (US); Tsai-Ching Lu, Thousand Oaks, CA (US); Dnyanesh Rajpathak, Troy, MI (US); John Anthony Cafeo, Farmington, MI (US)

(73) Assignees: HRL Laboratories, LLC, Malibu, CA (US); GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 377 days.

(21) Appl. No.: 16/523,893

(22) Filed: Jul. 26, 2019

(65) Prior Publication Data

US 2020/0057809 A1 Feb. 20, 2020

Related U.S. Application Data

(60) Provisional application No. 62/718,755, filed on Aug. 14, 2018.

(51) Int. Cl.
*G06F 40/30* (2020.01)
*G06F 40/289* (2020.01)
(Continued)

(52) U.S. Cl.
CPC ............ *G06F 40/30* (2020.01); *G06F 40/289* (2020.01); *G06K 9/6218* (2013.01); *G06Q 30/0201* (2013.01); *G07C 5/006* (2013.01)

(58) Field of Classification Search
CPC ........................................................ G06F 40/30
See application file for complete search history.

(56) References Cited

U.S. PATENT DOCUMENTS

| 2015/0007120 A1 | 1/2015 | Erickson |
| 2017/0091289 A1 | 3/2017 | Ohazulike et al. |

(Continued)

FOREIGN PATENT DOCUMENTS

| KR | 101417757 B1 | 7/2014 |
| KR | 1020180078911 A | 7/2018 |

OTHER PUBLICATIONS

Notification of the International Preliminary Report On Patentability Chapter 1 for PCT/US2019/043802; dated Feb. 25, 2021.

(Continued)

*Primary Examiner* — James J Debrow
(74) *Attorney, Agent, or Firm* — Tope-McKay & Associates

(57) ABSTRACT

Described is a system for identification of correlations in customer observables (COs). The system extracts key phrases representing COs from textual inputs from multiple data sources, wherein the COs are related to a consumer product. A unified hypergraph is constructed that models co-occurrences of COs. The unified hypergraph includes nodes and types of hyperedges connecting the nodes, where COs are represented by nodes and data sources are represented by different types of hyperedges. Each node of the unified hypergraph is embedded into a latent feature space. The unified hypergraph is partitioned into clusters within the latent feature space, where each cluster contains correlated CO data. The correlated CO data from a cluster are used to generate and provide targeted messages specific to the consumer product to a display device.

18 Claims, 10 Drawing Sheets

(51) Int. Cl.
*G06Q 30/02* (2012.01)
*G07C 5/00* (2006.01)
*G06K 9/62* (2006.01)

(56) References Cited

U.S. PATENT DOCUMENTS

2019/0130028 A1* 5/2019 Rajpathak et al. ...... G06F 17/30
2020/0026722 A1* 1/2020 Eade et al. .............. G06F 16/29

OTHER PUBLICATIONS

The International Preliminary Report on Patentability Chapter I for PCT/US2019/043802; dated Feb. 25, 2021.
Notification of Transmittal of International Search Report and the Written Opinion of the International Searching Authority for PCT/US2019/043802; dated Nov. 18, 2019.
International Search Report of the International Searching Authority for PCT/US2019/043802; dated Nov. 18, 2019.
Written Opinion of the International Searching Authority for PCT/US2019/043802; dated Nov. 18, 2019.
Chungmo Ryu, et al., "An Efficient Traversal Algorithm for Large Hypergraphs and its Applications for Graph Analysis," KIISE Transactions on Computing Practices, vol. 23, No. 8, pp. 492-497, 2017.
V. Jirkovsky, P. Kadera, and N. Rychtyckyj. Semi-automatic ontology matching approach for integration of various data models in automotive. In Industrial Applications of Holonic and Multi-Agent Systems—8th International Conference, HoloMAS 2017, Lyon, France, Aug. 28-30, 2017, Proceedings, pp. 53-65, 2017.
N. Rychtyckyj, V. Raman, B. Sankaranarayanan, P. S. Kumar, and D. Khemani. Ontology re-engineering: A case study from the automotive industry. AI Magazine, 38(1): pp. 49-60, 2017.
D. Zhou, J. Huang, and B. Scholkopf. Learning with hypergraphs: Clustering, classification, and embedding. In B. Scholkopf, J. C. Platt, and T. Hoffman, editors, Advances in Neural Information Processing Systems 19, pp. 1601-1608. MIT Press, 2007.

* cited by examiner

|  | $v_1$ | $v_2$ | $v_3$ | $v_4$ | $v_5$ | $v_6$ | $v_7$ | $v_8$ |
|---|---|---|---|---|---|---|---|---|
| $e_1$ | 1 | 1 | 1 | 0 | 0 | 0 | 0 | 0 |
| $e_2$ | 0 | 0 | 1 | 1 | 1 | 1 | 0 | 0 |
| $e_3$ | 0 | 0 | 0 | 0 | 0 | 1 | 1 | 1 |

FIG. 5B

Cluster 1:
IGNITION CYLINDER<>REPLACED
KEY<>CUT OFF
KEY<>WILL NOT TURN
LOCK<>WILL NOT GO INTO
IGNITION LOCK CYLINDER<>BINDING
LOCK CYLINDER<>FAILED
TUMBLERS<>STALLED
CYL<>LOCK
HOUSING<>LOCK
IGNITION<>LOCKED
IGNITION LOCK CYLINDER<>CUT
LOCK CYLINDER<>REMOVE
........

FIG. 7A

Cluster 2:
BATTERY<>CHARGE
CABLES<>TIGHT
GEAR<>STALLS
SYSTEM<>LOW
BCM<>REPROGRAMMED
BCM<>RESET
ELECTRICAL POWER<>NO CRANK NO START
IGNITION<>SHUT OFF
SHIFTER<>SHUT OFF
COMPUTERS<>NONE

FIG. 7B

Cluster 3:
CONTROL MODULE<>NOT STAY
POWER STEERING<>INOP
TOE<>ALIGNMENT
WIRE<>GROUND
BODY CONTROL MODULE<>U0131
FRONT END<>ALIGN
FRONT END<>SET
POWER STEERING GEAR<>REPROGRAM
POWER STEERING MODULE<>LOSS
STEERING CONTROL MODULE<>ALIGN
STEERING CONTROL MODULE<>REPROGRAM
STEERING RACK<>REPLACED
..........

FIG. 7C

HYPERGRAPH-BASED METHOD FOR SEGMENTING AND CLUSTERING CUSTOMER OBSERVABLES FOR VEHICLES

CROSS-REFERENCE TO RELATED APPLICATIONS

This is a Non-Provisional application of U.S. Provisional Application No. 62/718,755, filed in the United States on Aug. 14, 2018, entitled, "A Hypergraph-Based Method for Segmenting and Clustering Customer Observables for Vehicles," the entirety of which is incorporated herein by reference.

BACKGROUND OF INVENTION

(1) Field of Invention

The present invention relates to a system for identification of clusters of consumer observations and, more particularly, to a system for identification of clusters of consumer observations based on textual data from multiple sources.

(2) Description of Related Art

Recent advances in web technologies have enabled the generation and collection of massive amount of data records on vehicle defects and related issues. These records are made available from a diverse range of data sources, such as vehicle warranty data, technician reports, consumer complaints, and chat logs from vehicle call centers. Due to the massive quantity, it is important to develop an automated method to uncover underlying vehicle problems and organize them into categories.

Existing methods in the automotive industry are primarily Natural Language Processing (NLP)-based and rely on ontology-based and rule-based techniques for semantic clustering of vehicle defects and related issues (see Literature Reference Nos. 1 and 3). However, one of the main drawbacks of ontology-based methods is that they require manual curation of the semantic ontology for vehicles, which is very time consuming; it is difficult to maintain an up-to-date ontology to keep up with the amount of new data that are generated constantly. Furthermore, rule-based methods are typically not robust enough to handle noisy, free-form textual data that are generated from diverse data sources.

Thus, a continuing need exists for a system for efficient and effective automatic grouping of semantically related textual data that does not require any manual work and can handle user-generated, free-form text.

SUMMARY OF INVENTION

The present invention relates to a system for identification of clusters of consumer observations and, more particularly, to a system for identification of clusters of consumer observations based on textual data from multiple sources. The system comprises one or more processors and a non-transitory computer-readable medium having executable instructions encoded thereon such that when executed, the one or more processors perform multiple operations. The system extracts key phrases representing customer observables (COs) from a plurality of textual inputs from multiple data sources, wherein the COs are related to a consumer product. A unified hypergraph that models co-occurrences of COs is constructed, wherein the unified hypergraph comprises a plurality of nodes and a plurality of types of hyperedges connecting the nodes, and wherein COs are represented by nodes and data sources are represented by different types of hyperedges. Each node of the unified hypergraph is embedded into a latent feature space. The unified hypergraph is partitioned into clusters within the latent feature space, wherein each cluster contains correlated CO data. Using the correlated CO data from at least one cluster, the system generates and provides targeted messages specific to the consumer product to a display device.

In another aspect, the CO data is related to vehicle component issues.

In another aspect, the key phrases comprise one of a textual input related to a vehicle component and a textual input related to a vehicle symptom.

In another aspect, in partitioning the unified hypergraph, the system identifies an optimal partition of the unified hypergraph by minimizing cuts of the hyperedges.

In another aspect, each cluster has a size, and the system ranks the clusters by size, and, for one or more of the largest clusters, issues an alert related to vehicle component failure data in the one or more largest clusters.

In another aspect, the clusters are used to identify associations among vehicle component failures.

In another aspect, the unified hypergraph is denoted by $G(V,E,w)$, where $V$ represents the plurality of nodes, $E$ represents the plurality of types of hyperedges, and $w$ represents a weight function, wherein each hyperedge $e \in E$, wherein a degree of a hyperedge $e$ is defined by $\delta(e)=|e|$, which is the cardinality of $e$, and wherein a degree of a node $v$ is defined as $$d(v) = \sum_{e \in E | v \in e} w(e),$$

which is the sum of the weights of all the hyperedges that contain the node.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5B is an illustration of an incidence matrix representing the connectivities of the hypergraph in FIG. 5A according to some embodiments of the present disclosure;

FIG. 7A illustrates examples of COs from a first identified cluster according to some embodiments of the present disclosure;

FIG. 7B illustrates examples of COs from a second identified cluster according to some embodiments of the present disclosure; and FIG. 7C illustrates examples of COs from a third identified cluster according to some embodiments of the present disclosure.

DETAILED DESCRIPTION

Figure 1:
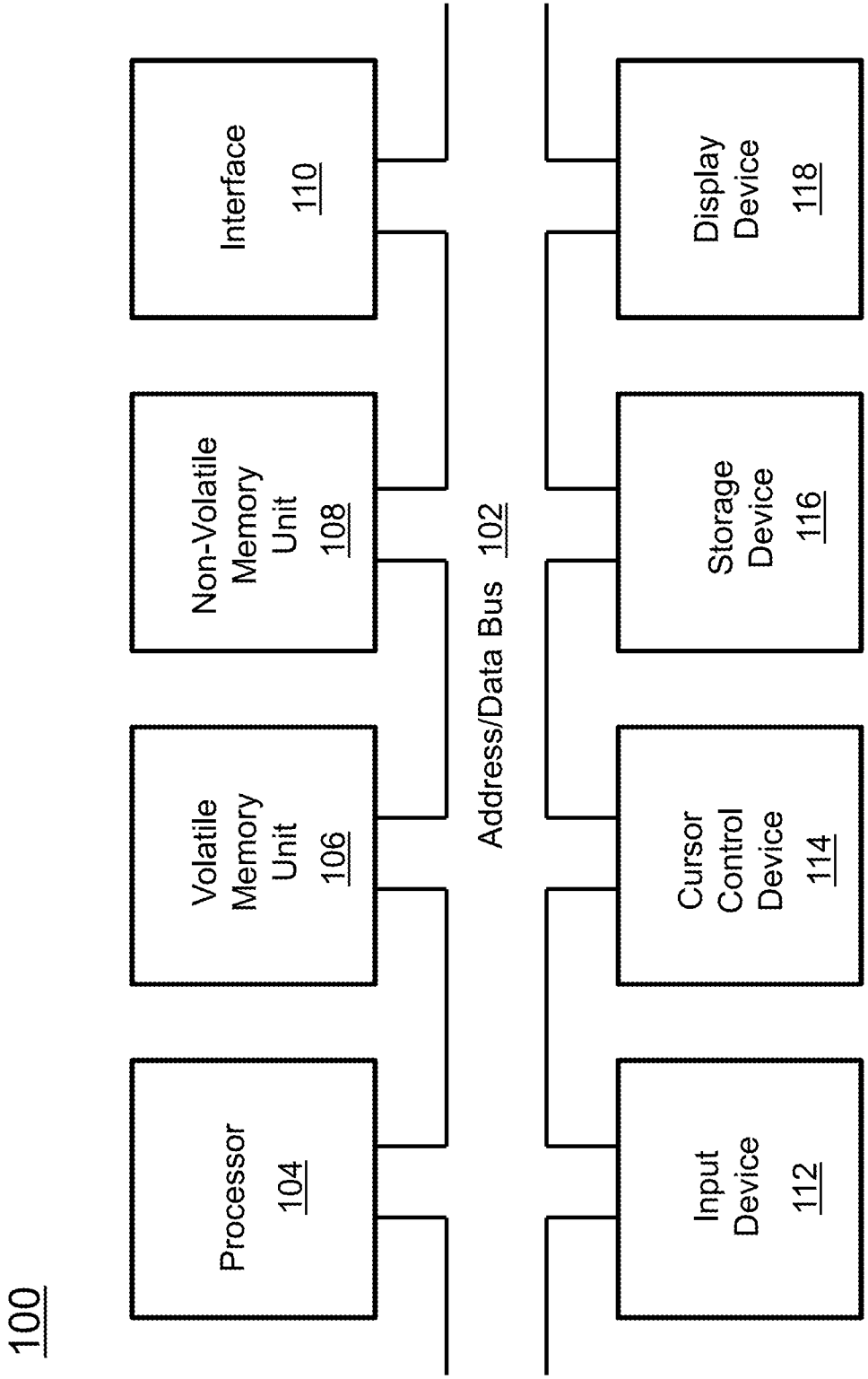
FIG. 1 is a block diagram depicting the components of a system for identification of clusters of consumer observations according to some embodiments of the present disclosure.

The present invention relates to a system for identification of clusters of consumer observations and, more particularly, to a system for identification of clusters of consumer observations based on textual data from multiple sources. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature and Patent References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. V. Jirkovsky, P. Kadera, and N. Rychtyckyj. Semi-automatic ontology matching approach for integration of various data models in automotive. In Industrial Applications of Holonic and Multi-Agent Systems—8th International Conference, HoloMAS 2017, Lyon, France, Aug. 28-30, 2017, Proceedings, pages 53-65, 2017.
2. D. Rajpathak, S. H. Owen, J. A. Donndelinger, J. Cafeo, M. Case, C. Nguyen, and C. Chandler. Machine-based extraction of customer observables from unstructured text data and reducing false positives therein. US 2019/0130028.
3. N. Rychtyckyj, V. Raman, B. Sankaranarayanan, P. S. Kumar, and D. Khemani. Ontology re-engineering: A case study from the automotive industry. AI Magazine, 38(1): 49-60, 2017.
4. D. Zhou, J. Huang, and B. Scholkopf. Learning with hypergraphs: Clustering, classification, and embedding. In B. Scholkopf, J. C. Platt, and T. Hoffman, editors, Advances in Neural Information Processing Systems 19, pages 1601-1608. MIT Press, 2007.

(2) Principal Aspects

Various embodiments of the invention include three "principal" aspects. The first is a system for identification of clusters of observations. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
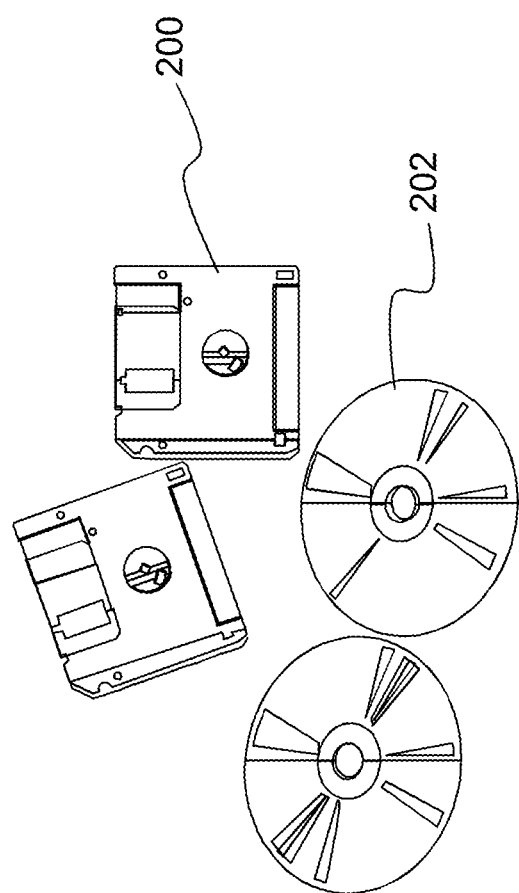
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a unique hypergraph-based method for segmenting and clustering semantically-related key phrases from unstructured text files. This is a critical technology which enables automated analytics capabilities for business intelligence applications. While this disclosure focuses on grouping key phrases that are in the context of vehicle component defects and failures, it can be appreciated by one skilled in the art that the present invention is applicable to other applications (e.g., grouping product reviews) with a wide variety of textual data.

Given a collection of text corpora (e.g., technician reports, customer complains), the method according to embodiments of the present disclosure first extracts key phrases from the textual inputs using, for instance, the method in Literature Reference No. 2 to characterize various vehicle-related information, such as vehicle parts and defect symptoms. The key phrases are referred to as Customer Observables (COs). Subsequently, a unified hypergraph (see Literature Reference No. 4) is constructed to model the co-occurrences of these customer observables. Specifically, nodes correspond to COs, and edges contain subsets of COs that are extracted from the same record (e.g., a single report). Different types of edges are included in such a representation to capture different types of textual inputs. A generalized spectral embedding and clustering technique is then applied to partition the hypergraph into groups (or categories), which contain COs that are highly specific to particular vehicle issues and defects. The overall idea of the clustering step is to formulate it as an optimization problem which aims to identify partitions by minimizing the cuts of the hyper-edges based on their edge weights.

The method described herein enables autonomous generation of CO clusters effectively without the need of human supervision, and it provides assistance to analysts in organizing massive unstructured vehicle-related data and discovering underlying issues. In this context, "unstructured" refers to free-form text, which is not easy to group. For example, one person may write "two-door front wheel drive", while another may write "2DR-FWD" for the same vehicle type. Subsequently, the clustering information can be used for vehicle profiling (e.g., ranking component failures) and prioritizing vehicle maintenance. Thus, a primary objective of this disclosure is to enable efficient and effective identification of latent clusters of vehicle defects and related issues based on noisy textual data that are collected from multiple sources. This invention is applicable to all types of man-made vehicles (e.g., ground and aerial vehicles, manned and unmanned vehicles).

Figure 3:
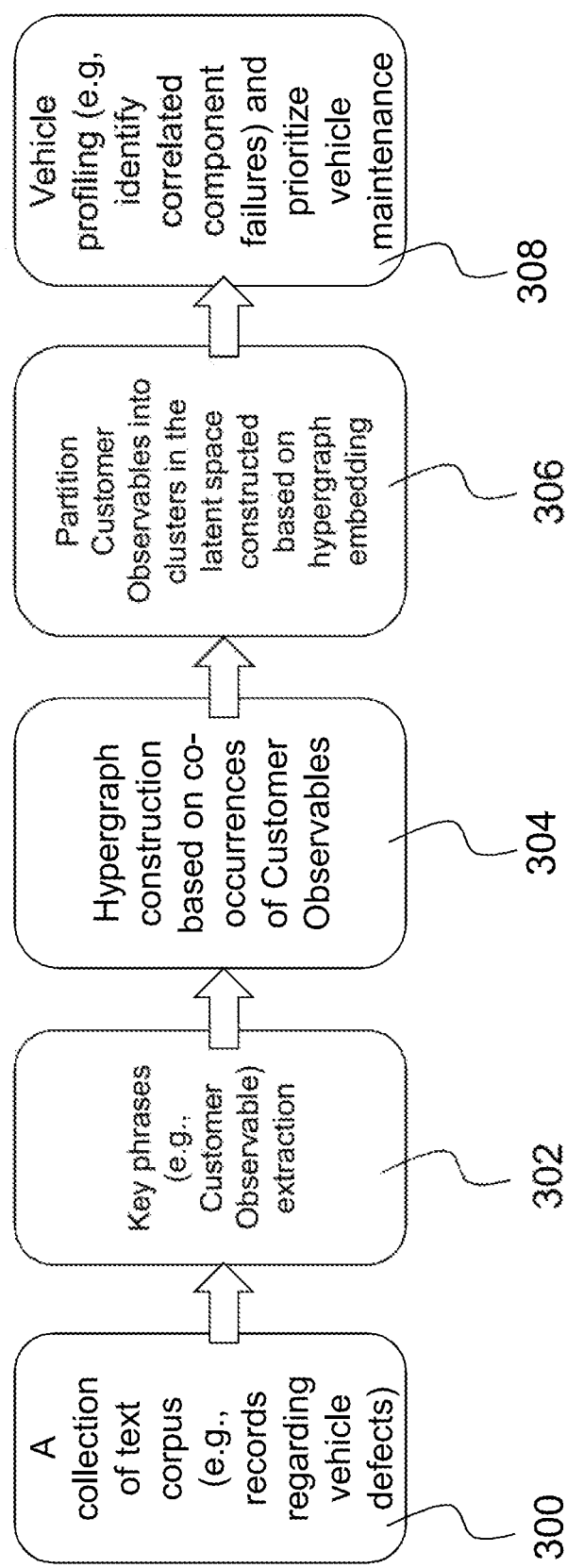
FIG. 3 is a flow diagram illustrating hypergraph-based clustering of vehicle defects according to some embodiments of the present disclosure.

FIG. 3 depicts key components of hypergraph-based clustering of vehicle defects and related issues. The input of the method is a collection of text corpora (element 300). First, key phrases/COs are extracted from the (multi-source) textual inputs (element 302). In one embodiment, the method described in Literature Reference No. 2 is used to extract key phrases that describe different aspects of the vehicles. Then, a hypergraph representation is used to capture the co-occurrences of the key phrases (element 304). Subsequently, a generalized spectral embedding and clustering technique is used to identify groups of highly related vehicle defects and issues (element 306). Finally, the identified clusters can be used for vehicle profiling and prioritizing vehicle maintenance (element 308). Detailed descriptions of each of the components will be described in the following sections.

(3.1) Key Phrase (Customer Observable) Extraction (Element 302)

Figure 4:
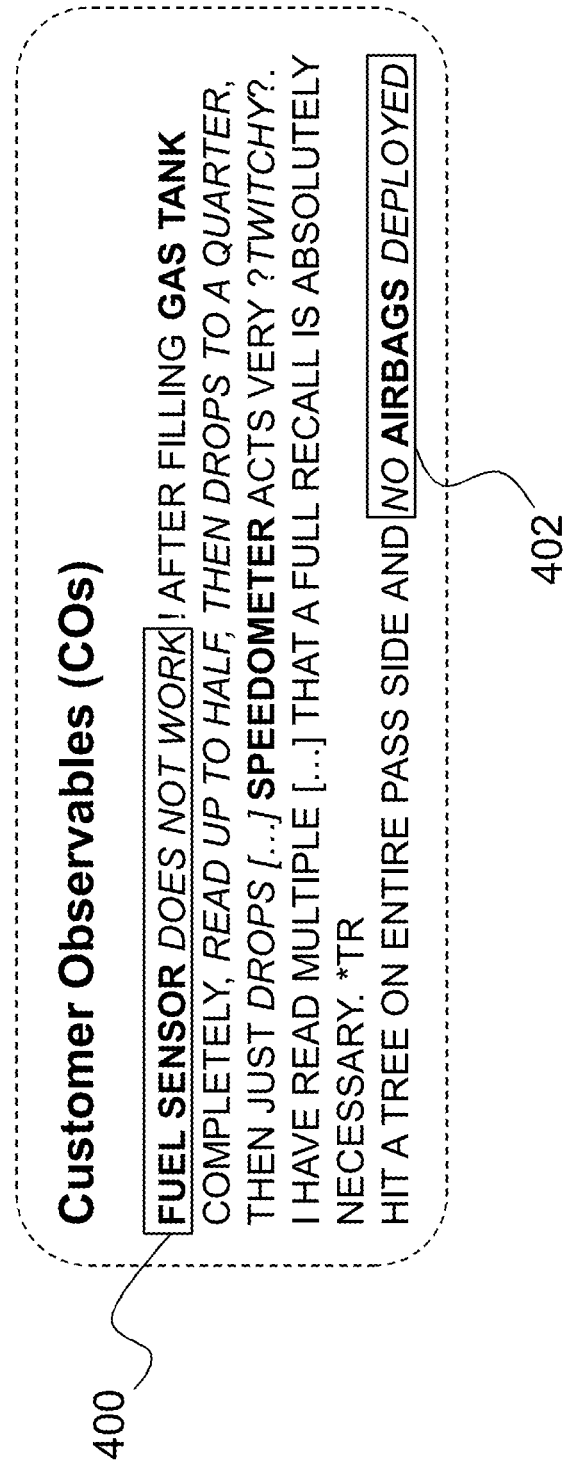
FIG. 4 illustrates examples of extracted Customer Observables (COs) according to some embodiments of the present disclosure.

Given a collection of text corpora (e.g., technician reports, customer complains), key phrases are first extracted from the textual inputs. Based on the technique disclosed in Literature Reference No. 2, a plurality of different types of key phrases describing various aspects of the vehicles are extracted, including vehicle parts (S1), vehicle symptoms (SY), body impact (BI), body anatomy (BA), accident events (AE), vehicle location (LO), and potential impact (PI). FIG. 4 depicts examples of extracted COs outlined by rectangles. The embodiment described herein focuses on the first two types of key phrases: vehicle parts (bold text in FIG. 4) and vehicle symptoms (italicized text in FIG. 4). The combination of the two types of key phrases becomes the Customer Observables (COs). These COs are the basic information tokens in the method according to embodiments of the present disclosure, which form the nodes in the hypergraph representation.

(3.2) Hypergraph Construction (Element 304)

In a hypergraph, which is a generalization of regular bi-graphs, the edges are arbitrary non-empty subsets of the node set (see Literature Reference No. 4). A main benefit of such a representation is that it can model the high-order (e.g., three or more) co-occurrence relationships among nodes more accurately due to the "averaging" effect provided by the hypergraph neighborhood structure. Formally, let G(V,E,w) denote a hypergraph where V is the set of nodes, E is the set of hyperedges, and w is a weight function defined as w:E→R. Each hyperedge e∈E is a subset of V. Two important definitions of hypergraphs are the degree of a hyperedge and the degree of a node. The degree of a hyperedge e is defined by $\delta(e)=|e|$, which is the cardinality of e. The degree d(v) of a node v is defined as $$d(v) = \sum_{e \in E | v \in e} w(e),$$

which is the sum of the weights of all the hyperedges that contain this node.

Figure 5A:
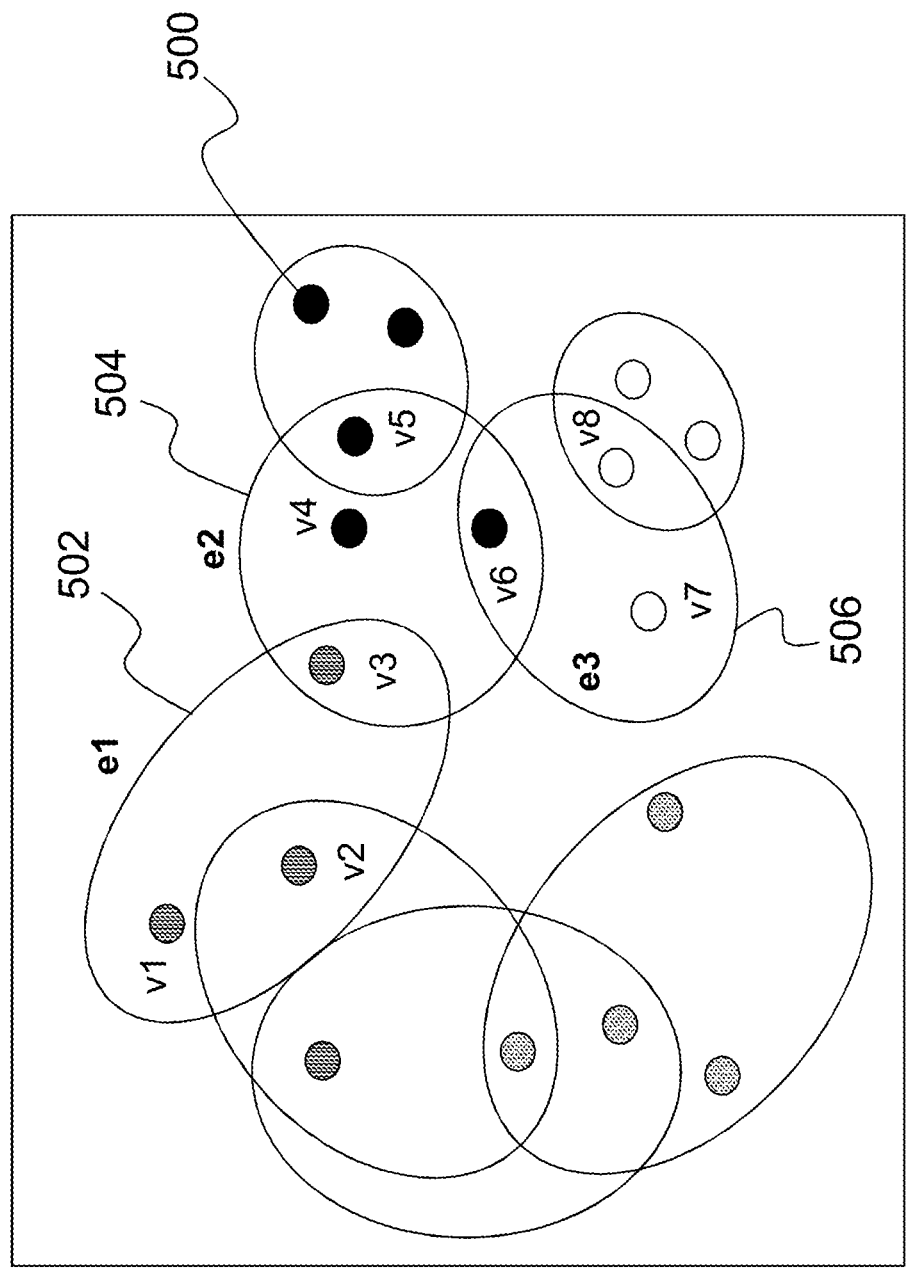
FIG. 5A is an illustration of a hypergraph, where various nodes indicate CO clusters according to some embodiments of the present disclosure.

FIG. 5A shows an example of the hypergraph representation. As described above, each CO is a node (represented by a circle (e.g., element 500)) in the hypergraph representation. A hyperedge (represented by an oval (e.g., element 502) is constructed to capture all the COs that are extracted from the same vehicle record (e.g., a single technician report or a single record of customer complaint). For instance, e1 (element 502) in FIG. 5A corresponds to a particular vehicle record, which contains three COs (thus the degree of e1 is 3). Similar interpretation can be made for e2 (element 504), e3 (element 506), and the rest of the edges.

A hypergraph is usually represented by an incidence matrix $H \in R^{|V| \times |E|}$ whose entry H(v, e) is 1 if v∈E and 0 otherwise. FIG. 5B depicts a portion of an incidence matrix representing the connectivities of the hypergraph in FIG. 5A. The degree δ(e) of a hyperedge e and the degree d(v) of a vertex v is then:

$$d(v) = \sum_{e \in E} w(e) H(v, e), \quad (1)$$

$$\delta(e) = \sum_{v \in V} H(v, e). \quad (2)$$

Essentially, d(v) is a weighted sum of a row in the incidence matrix H, and δ(e) is a sum of a column in the incidence matrix H. $D_e$ and $D_v$ are used to denote the $|V| \times |V|$ and $|E| \times |E|$ diagonal matrices consisting of hyperedge and vertex degrees, respectively. W is a $|E| \times |E|$ diagonal matrix containing hyperedge weights. The computation of W(e) is application dependent. In one embodiment, a uniform weight is assigned to all the edges. A unified hypergraph is a hypergraph which has multiple types of nodes and/or hyperedges. COs are viewed as nodes, and the data sources (e.g., different types of vehicle-related reports) from which COs are extracted can be represented by different types of hyperedges. These different types of edges can be conveniently added to the incidence matrix H by appending the appropriate columns.

(3.3) Embedding and Partitioning of Customer Observables (COs) (Element 306)

Given the CO hypergraph, the aim is to generate groups of COs that are highly-related in describing similar vehicle defects. The basic idea is to identify an optimal partition of the hypergraph by minimizing the cuts of the hyper-edges. Let $S \subset V$ denote a subset of nodes and $S^c$ denote the complement of S. Then, the two-way partition of the hypergraph is defined as:

$$Hcut(S, S^c) = \sum_{e \in \partial S} w(e) \frac{|e \cap S||e \cap S^c|}{\delta(e)}, \quad (3)$$

where $\partial S = \{e \in E | e \cap S \neq \emptyset, e \cap S^c \neq \emptyset\}$ is the set of hyperedges to partition the hypergraph G into two parts and $\delta(e)$ is the degree of the hyperedge e defined above. The definition of $Hcut(S,S^c)$ can be understood as a weighted sum of all hyperedges weights in $\partial S$. The normalized two-way partition can be defined to avoid the bias of unbalanced partitioning as:

$$NHcut(S, S^c) = Hcut(S, S^c)\left(\frac{1}{vol(S)} + \frac{1}{vol(S^c)}\right), \quad (4)$$

where $$= vol(S) = \sum_{v \in S} d(v)$$

is the volume of S. Finding a partition which minimizes equation (4) is a NP-complete problem but it can be relaxed to a real-valued optimization as described in Literature Reference No. 4 as follows:

$$\arg\max_{p \in \mathbb{R}^{|V|}} \sum_{e \in E} \sum_{\{u,v\} \subset e} \frac{w(e)}{\delta(e)} \left(\frac{p(u)}{\sqrt{d(u)}} - \frac{p(v)}{\sqrt{d(v)}}\right)^2 = \arg\min_{p \in \mathbb{R}^{|V|}} 2p^T \Delta p, \quad (5)$$

where p is a label vector (for cluster assignment) and $\Delta = I - D_v^{-1/2} H W D_e^{-1} H^T D_v^{-1/2}$ is a positive semidefinite matrix, which is known as the hypergraph Laplacian matrix. The solution of this optimization problem is the eigenvector associated with the smallest nonzero eigenvalue of $\Delta$. In order to generalize the two-way partition to k-way partition, a straightforward method is to iteratively apply 2-way partition until a stopping condition is reached. An alternative method is to apply a clustering mechanism (e.g., k-means) on a subset of the eigenvectors (e.g., k smallest eigenvectors). In an embodiment of the present disclosure, the first three eigenvectors with nonzero eigenvalues of $\Delta$ are taken as the indicators, and then k-means clustering is applied on the resulting eigenspace to obtain the final clustering results. This procedure can be considered as embedding each node of the hypergraph into a latent feature space (i.e., k-dimensional space) and, subsequently, performing clustering within the latent space.

(3.4) Vehicle Profiling Based on Hypergraph Partitioning (Element 308)

The identified clusters from section (3.3) can be used directly by automotive analysts for vehicle profiling. In a coarse level, the size of the clusters (i.e., the number of records/vehicles in each cluster) can be used to prioritize vehicle maintenance. For instance, a ranked list of vehicle maintenance issues can be automatically generated and provided to a technician. For issues on top of the list (i.e., the corresponding clusters are large enough), the system described herein can also issue an alert with a description of the components (e.g., ignition cylinder, batter, body control module (BCM)) that need to be examined, reviewed, or redesigned.

In a finer level, each cluster contains correlated vehicle component failures. This can generate and provide guidance and specific vehicle service instructions for technicians when serving vehicles, such as to inspect related vehicle components that often have failures together. These instructions can be automatically provided to a user, such as a technician, via a device having a display (e.g., smartphone, tablet). The customized instructions would be specific to the vehicle model and the year of the vehicle, and perhaps even to a particular vehicle (vehicle identification number (VIN)). Although correlation does not indicate causation, the frequent co-occurrence of component failures provides indication for further investigation. Furthermore, when new records (e.g., on vehicle defects) arrive, the method can automatically categorize them and forward them to the most appropriate maintenance department(s) for follow-up analysis.

(3.5) Experimental Studies

Figure 6:
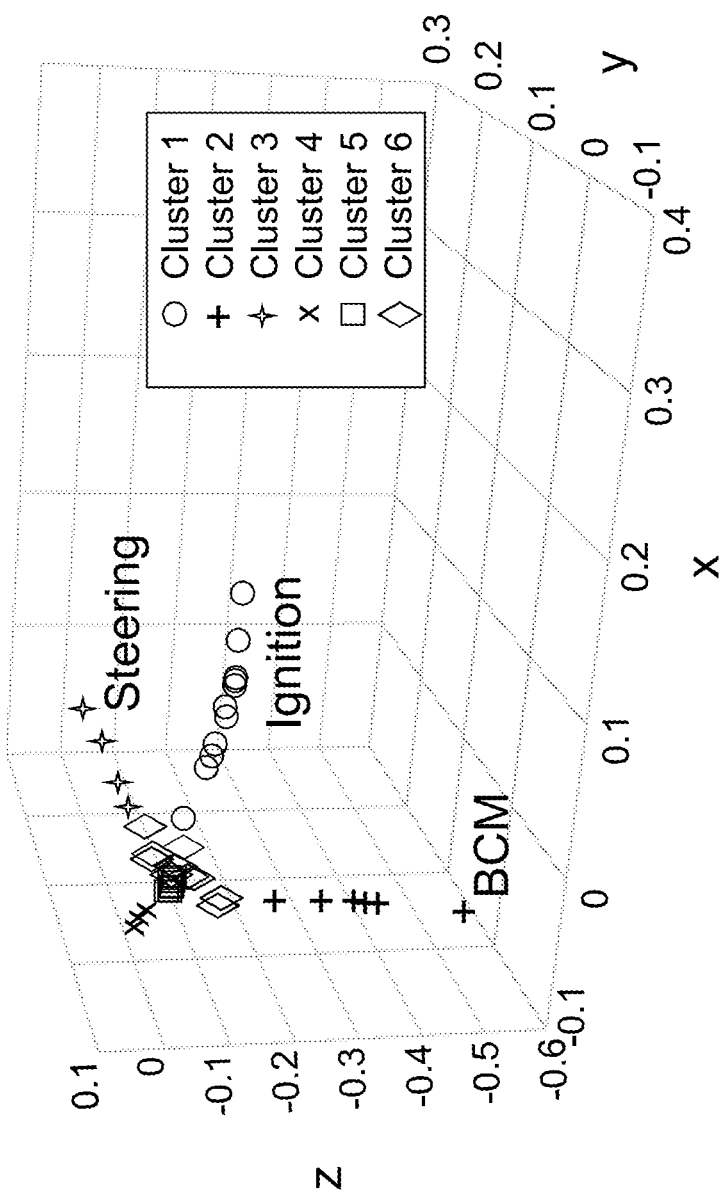
FIG. 6 is an illustration of a three-dimensional (3D) space formed by the three smallest nonzero eigenvectors of the hypergraph Laplacian matrix according to some embodiments of the present disclosure.

The method according to embodiments of the present disclosure was evaluated with a subset of the 2013 vehicle warranty records provided by General Motors. FIG. 6 shows the three-dimensional (3D) eigenspace computed from the constructed hypergraph Laplacian matrix (see section (3.3)). The 3D space is formed by the three smallest nonzero eigenvectors of the hypergraph Laplacian matrix. In this 3D space, clusters are formed for different topics related to vehicle defects. For instance, BCM is denoted as '+', Ignition is denoted as 'o', and Steering is denoted as '*'. The k-means algorithm is applied to decompose the eigenspace into groups. The value of k is estimated empirically and set to six in the experiment. Different symbols (e.g., *, o, +) indicate cluster/group memberships. Example COs belonging to different clusters are listed in FIGS. 7A, 7B, and 7C. Each of these CO groups reflects different "topics" in terms of vehicle defects. For instance, cluster 1 (FIG. 7A) is clearly related to an underlying vehicle ignition problem, because the data points related to "ignition" (denoted by 'o') are localized in a specific region of the 3D space (determined by the three eigenvectors). By running any standard unsupervised clustering algorithm, such as k-means, the data points corresponding to "Ignition" will be clustered into the same group. Similar observations can be made for other clusters, which correspond to different issues related to steering and the brake control module (BCM). In summary, the resulting clusters effectively identify the hidden associations among vehicle component failures and provide new insight for automotive analysts.

The benefits of the method described herein include unsupervised clustering and segmentation of vehicle-related defects and issues from textual data; effective integration of multi-source textual inputs through a unified hypergraph representation with heterogeneous edges; adaptability to a wide range of applications in finding latent clusters from multi-modal textual inputs; modular and extensible design of algorithmic framework; and limited parameters for adjustment. A non-limiting example of a parameter that can be adjusted includes a number of partitions (or k-way partitions). From a high-level, this translates to grouping vehicle defects or failures into k categories. Another example of a parameter is the number of eigenvectors used to form the latent space of vehicle defects (e.g., three-dimensional).

The invention according to embodiments of the present disclosure has multiple useful applications. For example, the system and method can be used for vehicle defect monitoring, emerging vehicle issue surveillance, and vehicle marketing related personalized incentives. The invention described herein can be applied to partition user preference space. For instance, users that fall in the same group can be offered the same or similar incentives. In addition, the system and method can be used for identification of special interest groups (e.g., political alignment, terrorist groups), and other intelligence applications. This is essentially a clustering problem. For example, people with similar political preferences are likely to talk about similar things. Based on the key phrases extracted from their online content (e.g., tweets, messages) using standard natural language processing techniques, the method according to embodiments of the present disclosure can be used to cluster the content space and, subsequently, put users into groups.

Further, the present invention is applicable to other domains, such as mining consumer opinions. For example, if users are interested in certain vehicle features, then an automotive manufacture should take that information into account in designing future vehicle models. Mined consumer opinions can also be used for personalized incentive or marketing strategies. As yet another example, the system can be implemented within or otherwise interface with a social media network to allow an operator to target particular users on the social media network. In this aspect, the personalized incentives could be discounts and advertisements pushed to particular users on their social media accounts based on the user's interest in a particular product or service.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for identification of correlations in customer observables, the system comprising:
one or more processors and a non-transitory memory having instructions encoded thereon such that when the instructions are executed, the one or more processors perform operations of:
extracting key phrases representing customer observables (COs) from a plurality of textual inputs from multiple data sources, wherein the COs are related to a consumer product;
constructing a unified hypergraph that models co-occurrences of COs, wherein the unified hypergraph comprises a plurality of nodes and a plurality of types of hyperedges connecting the nodes, and wherein COs are represented by nodes and data sources are represented by different types of hyperedges,
wherein the unified hypergraph is denoted by $G(V,E,w)$, where V represents the plurality of nodes, E represents the plurality of types of hyperedges, and w represents a weight function, wherein each hyperedge $e \in E$, wherein a degree of a hyperedge e is defined by $\delta(e)=|e|$, which is the cardinality of e, and wherein a degree of a node v is defined as $d(v)=\Sigma_{e \in E | v \in e} w(e)$, which is the sum of the weights of all the hyperedges that contain the node;
embedding each node of the unified hypergraph into a latent feature space;
partitioning the unified hypergraph into clusters within the latent feature space, wherein each cluster contains correlated CO data; and
using the correlated CO data from at least one cluster, generating and providing targeted messages specific to the consumer product to a display device.

2. The system as set forth in claim 1, wherein the correlated CO data is related to vehicle component issues.

3. The system as set forth in claim 2, wherein the key phrases comprise one of a textual input related to a vehicle component and a textual input related to a vehicle symptom.

4. The system as set forth in claim 2, wherein each cluster has a size, and wherein the one or more processors further perform operations of:
ranking the clusters by size; and
for one or more of the largest clusters, issuing an alert related to vehicle component failure data in the one or more largest clusters.

5. The system as set forth in claim 2, wherein the clusters are used to identify associations among vehicle component failures.

6. The system as set forth in claim 1, where in partitioning the unified hypergraph, the one or more processors further perform an operation of identifying an optimal partition of the unified hypergraph by minimizing cuts of the hyperedges.

7. A computer implemented method for identification of correlations in customer observables, the method comprising acts of:
causing one or more processors to execute instructions encoded on a non-transitory computer-readable medium, such that upon execution, the one or more processors perform operations of:
extracting key phrases representing customer observables (COs) from a plurality of textual inputs from multiple data sources, wherein the COs are related to a consumer product;
constructing a unified hypergraph that models co-occurrences of COs, wherein the unified hypergraph comprises a plurality of nodes and a plurality of types of hyperedges connecting the nodes, and wherein COs are represented by nodes and data sources are represented by different types of hyperedges,
wherein the unified hypergraph is denoted by $G(V,E,w)$, where V represents the plurality of nodes, E represents the plurality of types of hyperedges, and w represents a weight function, wherein each hyperedge $e \in E$, wherein a degree of a hyperedge e is defined by $\delta(e)=|e|$, which is the cardinality of e, and wherein a degree of a node v is defined as $d(v)=\Sigma_{e \in E | v \in e} w(e)$, which is the sum of the weights of all the hyperedges that contain the node;

embedding each node of the unified hypergraph into a latent feature space;

partitioning the unified hypergraph into clusters within the latent feature space, wherein each cluster contains correlated CO data; and using the correlated CO data from at least one cluster, generating and providing targeted messages specific to the consumer product to a display device.

8. The method as set forth in claim 7, wherein the correlated CO data is related to vehicle component issues.

9. The method as set forth in claim 8, wherein the key phrases comprise one of a textual input related to a vehicle component and a textual input related to a vehicle symptom.

10. The method as set forth in claim 8, wherein each cluster has a size, and wherein the one or more processors further perform operations of:

ranking the clusters by size; and for one or more of the largest clusters, issuing an alert related to vehicle component failure data in the one or more largest clusters.

11. The method as set forth in claim 8, wherein the clusters are used to identify associations among vehicle component failures.

12. The method as set forth in claim 7, where in partitioning the unified hypergraph, the one or more processors further perform an operation of identifying an optimal partition of the unified hypergraph by minimizing cuts of the hyperedges.

13. A computer program product for identification of correlations in customer observables, the computer program product comprising:

computer-readable instructions stored on a non-transitory computer-readable medium that are executable by a computer having one or more processors for causing the processor to perform operations of:

extracting key phrases representing customer observables (COs) from a plurality of textual inputs from multiple data sources, wherein the COs are related to a consumer product;

constructing a unified hypergraph that models co-occurrences of COs, wherein the unified hypergraph comprises a plurality of nodes and a plurality of types of hyperedges connecting the nodes, and wherein COs are represented by nodes and data sources are represented by different types of hyperedges, wherein the unified hypergraph is denoted by G(V,E,w), where V represents the plurality of nodes, E represents the plurality of types of hyperedges, and w represents a weight function, wherein each hyperedge $e \in E$, wherein a degree of a hyperedge e is defined by $\delta(e)=|e|$, which is the cardinality of e, and wherein a degree of a node v is defined as $d(v)=\Sigma_{e \in E | v \in e} w(e)$, which is the sum of the weights of all the hyperedges that contain the node;

embedding each node of the unified hypergraph into a latent feature space;

partitioning the unified hypergraph into clusters within the latent feature space, wherein each cluster contains correlated CO data; and using the correlated CO data from at least one cluster, generating and providing targeted messages specific to the consumer product to a display device.

14. The computer program product as set forth in claim 13, wherein the correlated CO data is related to vehicle component issues.

15. The computer program product as set forth in claim 14, wherein the key phrases comprise one of a textual input related to a vehicle component and a textual input related to a vehicle symptom.

16. The computer program product as set forth in claim 14, wherein each cluster has a size, and wherein the one or more processors further perform operations of:

ranking the clusters by size; and for one or more of the largest clusters, issuing an alert related to vehicle component failure data in the one or more largest clusters.

17. The computer program product as set forth in claim 14, wherein the clusters are used to identify associations among vehicle component failures.

18. The computer program product as set forth in claim 13, where in partitioning the unified hypergraph, the one or more processors further perform an operation of identifying an optimal partition of the unified hypergraph by minimizing cuts of the hyperedges.

* * * * *